United States Patent [19]

Long

[11] Patent Number: 4,804,977
[45] Date of Patent: Feb. 14, 1989

[54] IMAGE OR PATTERN TRANSFER OPTICAL SYSTEM FOR THERMAL DYE TRANSFER APPARATUS

[75] Inventor: Michael E. Long, Fairport, N.Y.

[73] Assignee: Eastman Kodak Company, Rochester, N.Y.

[21] Appl. No.: 182,278

[22] Filed: Apr. 14, 1988

[51] Int. Cl.⁴ .................. G01D 15/10; G02F 1/13
[52] U.S. Cl. .................................. 346/76 L; 350/330
[58] Field of Search ............... 346/76 L, 1.1; 350/330

[56] References Cited

U.S. PATENT DOCUMENTS 3,570,380  4/1971  Kamenstein .
4,449,153  5/1984  Tschang ...................... 346/1.1 X
4,636,807  1/1987  Head ............................. 346/1.1
4,652,851  3/1987  Lewin ........................ 350/330 X
4,744,073  5/1988  Sugiki ....................... 346/76 L X

*Primary Examiner*—George H. Miller, Jr.
*Attorney, Agent, or Firm*—Raymond L. Owens

[57] ABSTRACT

A thermal dye transfer apparatus includes a laser which illuminates an image or pattern produced by a liquid crystal display. This laser image is projected onto a dye carrying donor. The donor absorbs heat from laser light and dye transfers by sublimation from the donor to the receiver to form the image or pattern in the receiver.

1 Claim, 2 Drawing Sheets

IMAGE OR PATTERN TRANSFER OPTICAL SYSTEM FOR THERMAL DYE TRANSFER APPARATUS

TECHNICAL FIELD

This invention relates to a thermal dye transfer apparatus which uses laser light to provide the heat source for dye transfer.

BACKGROUND ART

In one type of thermal printer which prints colored images, a donor contains a repeating series of spaced frames of different colored heat transferable dyes. The donor is disposed between a receiver, such as coated paper, and a print head formed of, for example, a plurality of individual heating resistors. When a particular heating resistor is energized, it produces heat and causes dye from the donor to transfer to the receiver. The density or darkness of the printed color dye is a function of the energy delivered from the heating element to the donor.

Thermal dye transfer printers offer the advantage of true "continuous tone" dye density transfer. This result is obtained by varying the energy applied to each heating element, yielding a variable dye density image pixel in the receiver.

The thermal time constant of the resistors are quite long so that the rate of dissipation of heat is slow. As a result, the printing speed and the image contrast are limited. Alternatively, a very high power laser can be used in thermal dye transfer printing. Laser thermal printing uses a laser as a thermal source to heat a donor containing the material to be transferred to a receiver. The donor can contain an ink or monochrome type dye material which is transferred to a receiver. When a color copy is desired, three separate and distinct donor sheets each containing a dye of a different color are used. The thermal printer registers three separate images in a receiver which, when viewed together, produces a full color image.

Current methods of producing a dye transfer image by laser energy (see UK Patent Application GB 2 083 726) consist of scanning a laser across the donor sheet and heating and transferring one dye pixel at a time to be a receiver. Because of the high energy required for thermal printing, the scanning (printing) speeds are limited.

DISCLOSURE OF THE INVENTION

Accordingly, it is an object of this invention to provide for high speed dye transfer using laser light.

It has been determined that a complete light image at one time can be thermally printed without scanning components.

The object of this invention has been achieved in a thermal dye transfer apparatus in which dye is transferred by sublimation from a donor to a receiver by heating the dye in the donor, comprising:

(a) a laser which is energizable to produce a beam of light;

(b) display means for producing an image or pattern; such image being disposed in the light beam path so as to be illuminated by the light beam;

(c) means for focusing laser light from the illuminated image or pattern onto a predetermined area position on the donor; and (d) said donor including a heat absorbing layer which absorbs heat from the focused light in a sufficient amount to cause dye to sublime and transfer from the donor to the receiver to form the image or pattern in the receiver.

The thermal printing apparatus described herein does not use mechanical parts in the optical system as found in the common scanning apparatus. Consequently it is faster. Also, increased speed results because the entire image is recorded at one time without any mechanical return time. Furthermore, the image is sharper because mechanical hysteresis is not present. Further, the invention uses a "dry" process not requiring wet chemical processing and is environmentally clean.

The present invention can be advantageously used in continuous tone printing processes where printing speed, image sharpness, and/or a small size is required or desirable. Such application include but are not limited to small security marks on confidential or security receivers, ID badges, and projection slides.

MODES OF CARRYING OUT THE INVENTION

Figure 1:
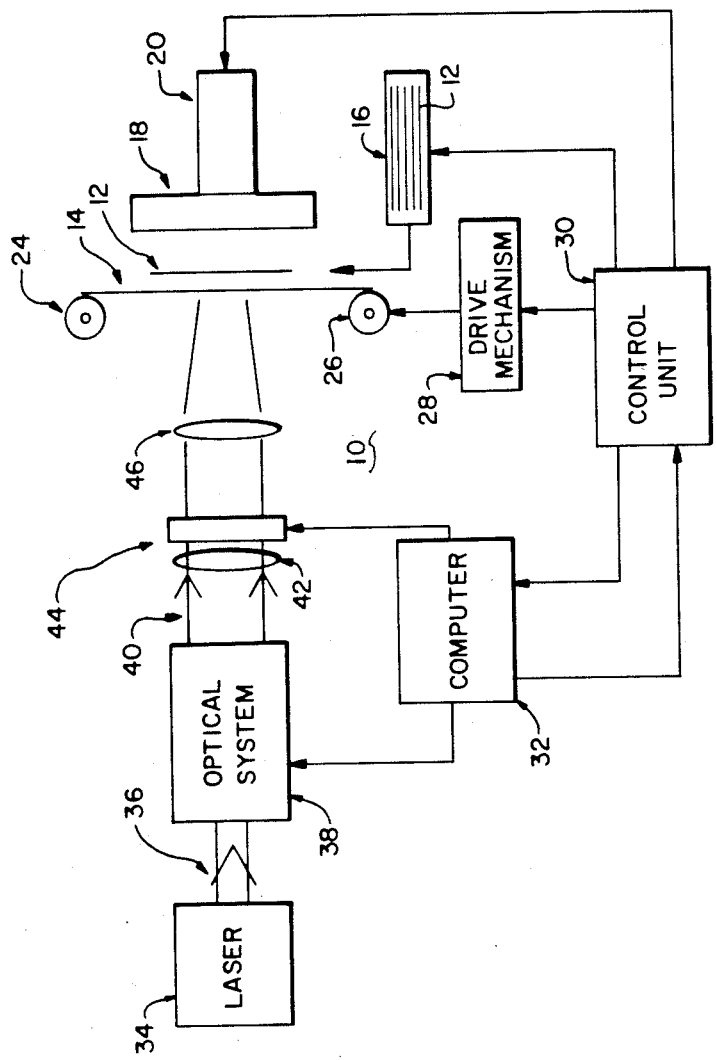
FIG. 1 is a schematic of a thermal printing apparatus which makes a dye image in a receiver in accordance with the invention.

Referring to FIG. 1 where a thermal printer apparatus 10 employs receivers 12 and a dye donor member 14. Receivers 12, in the form of sheet is serially fed from a tray 16 to a print position by a conventional sheet feeding mechanism, not shown. A platen 18 is moved into print position by an actuator 20 pressing the receiver 12 against the dye donor member 14. Actuators are well known in the field and can be provided by a mechanical linkage, solenoid, and small piston arrangement or the like.

The donor member 14 is driven along a path from a supply roller 24 onto a take-up roller 26 by a drive mechanism 28 coupled to the take-up roller 26. The drive mechanism 28 includes a stepper motor which incrementally advances and stops the donor relative to the receiver.

A control unit 30 having a microcomputer converts digital signals from a computer 32 to analog signals and sends them as appropriate control signals to the sheet feeding mechanism, actuator 20 and drive mechanism 28.

Each receiver 12 will be understood to include a receiving layer and a substrate. The receiving layer absorbs dye and retains the image dyes, to give a bright hue and prevents subsequent dye wandering. The substrate provides the support for the receiver sheet. In practice, polycarbonate may be used for the receiving layer and paper or film (such as polyethylene terephthalate) may be used as the substrate.

The donor 14 is pressed against the receiver sheet 12 by the actuator 20. The heat generated by incoming laser light from a laser evaporates the dye in the donor. The evaporated dye is then dispersed into the receiver.

The donor 14 includes a heat absorbing layer, base layer, and dye layer which includes binder and dye. The heat absorbing layer contains light absorbing pigment such as carbon black, evaporated nickel, and infrared dye. The base layer serves as the support of the donor sheet, a duPont Mylar ™ or a Kapton ™ may be used. The binder can be any polymeric material which provides adequate physical properties and allows dye to sublime out of the layer. Certain organic cellulosic materials such as cellulose nitrate, ethyl cellulose, cellulose triacetate, and cellulose mixed esters may be used as the binder in the dye laser.

Dye in the dye layer is transferable to the dye image-receiving layer of the dye-receiving element of the invention by the action of heat. Examples of sublimable dyes include anthrauinone dyes, e.g. Sumikalon Violet RS ™ (product of Sumitomo Chemical Co., Ltd.), Dianix Fast Violet 3R-FS ™ (product of Mitsubishi Chemical Industries, Ltd.), and Kayalon Polyol Brilliant Blue N-BGM ™ and KST Black 146 ™ (products of Nippon Kayaku Co., Ltd.), azo dyes such as Kayalon Polyol Brilliant Blue BM ™, Kayalon Polyol Dark blue 2BM ™, and KST Black KR ™ (products of Nippon Kayaku Co., Ltd.), Sumickaron Diazo Black 5G ™ (product of Sumitomo Chemical Co. Ltd.), and Mkitazol Black 5GH ™ (product of Mitsui Toatsu Chemicals, Inc.); direct dyes such as Direct Dark Green B ™ (product of Mitsubishi Chemical Industries, Ltd.) and Direct Brown M ™ and Direct Fast Black D ™ (products of Nippon Kayaku Co., Ltd.); acid dyes such as Kayanol Milling Cyanine 5R ™ (product of Nippon Kayaku Co., Ltd.); basic dyes such as Sumicacryl Blue 6G ™ (product of Sumitomo Chemical Co., Ltd.), and Aizen Malachite Green ™ (product of Hodogaya Chemical Co., Ltd.); or any of the dyes disclosed in U.S. Pat. No. 4,541,830. The above dyes may be employed singly to obtain a monochrome. The dyes may be used at a coverage of from about 0.05 to about 1 g/m$^2$ and are preferably hydrophobic.

On top of the dye layer, there can be provided matte beads of certain size to provide adequate spacing between the donor and the receiver and hence to maintain uniform dye transfer.

As shown in FIG. 1, laser 34 emits radiation 36 in a spectral region absorbed by the donor 14. This radiation 36 or laser beam is accepted by an optical system 38 which expands, controls and can apodize the laser beam 36 while maintaining its collimated character. The expanded beam 40 passes through a lens 42, an image display unit 44 and is focused by lens 46 onto the dye donor 14. The optical system 38, along with lenses 42 and 46, and the image display unit 44 are detailed in FIG. 2.

Figure 2:
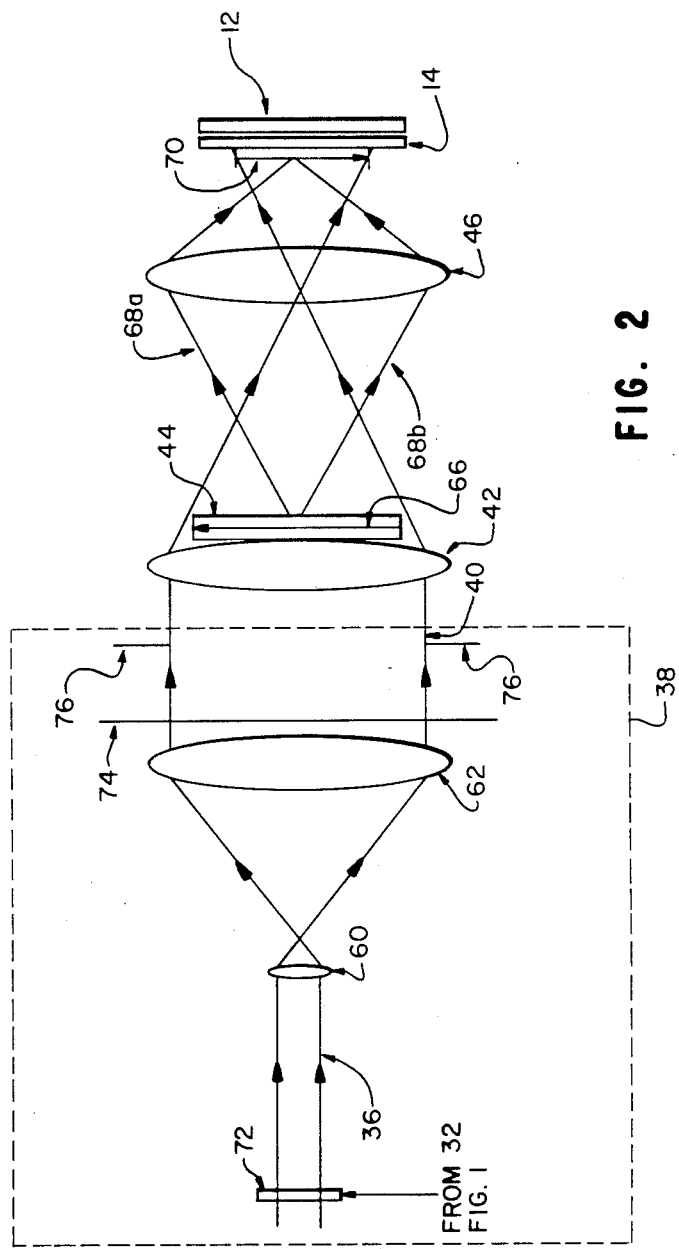
FIG. 2 shows an expanded view of a portion of FIG. 1 showing in more detail the optical system, donor and receiver.

Referring to FIG. 2, the laser beam 36 is controlled by mechanical shutter 72, focused and expanded by lens 60 and collected and recollimated by lens 62. The shutter is controlled by computer 32. The lens combination 60 and 62 when used in this manner is called a beam expander and is known to those skilled in the art. Between these lenses an apodizing filter can be placed for removing the gaussian nature of the expanded laser beam 40. Lens 42 focuses the light through the image display unit 44 onto the lens 46 and maintains the brightness of the laser source. The image display unit 44 contains or consists of the primary image 66 (shown as an arrow) and could be a computer addressable liquid crystal display device such as the commercially available KODAK DATASHOW System, a transparency or other such transparent hard or soft image. It will also be understood to those skilled in the art that if the displayed image is a fourier transform, the optical system would have to be modified. The lenses 42 and 62 when used in combination are referred to as a condenser by those skilled in the art.

The lens 46, known as a projection lens to those skilled in the art, collects the diffracted rays 68a and 68b produced by the primary image 66 and recombines them at the plane of the secondary image 70. The secondary image 70 will be inverted with respect to the primary image 66. The secondary image 70 illuminates the dye donor 14 and will be recorded on the receiver sheet 12 by dye sublimation as the negative of the primary image 66. Of course, the negative of the desired image can be utilized as the primary image 66 as is commonly done in the photographic printing industry. The combination of lenses 62, 42 and 46 with primary image 66 is known as a projection condenser system.

While the invention has been described with reference to the embodiment disclosed, it is not confined to the details set forth, but is intended to cover such modifications or changes as may come within the scope of the following claims.

I claim:

1. In a continuous tone thermal dye transfer apparatus in which a web of dye carrying donor is moved along a predetermined path in relation to a receiver sheet and wherein dye from the donor is transferred by sublimation from the donor to the receiver to form dye image in the receiver, an image or pattern transfer system comprising:

(a) a laser which is energizable to produce a beam of light;
   (b) means including a collimating lens and a focusing lens for focusing light from the energized laser diode onto a predetermined area on the donor;
   (c) a liquid crystal display disposed between the collimating lens and the focusing lens and adapted to produce an image or pattern and arranged so that such beam illuminates the image or pattern as it passes through the display;
   (d) said donor including (i) a heat absorbing layer which absorbs heat from each focused light spot, and (ii) a layer having dye embedded in a binder, arranged so that heat absorbed by the heating absorbing layer is transferred to the dye layer in a sufficient amount to cause dye to sublime and transfer from the donor to the receiver to form the image or pattern; and
   (e) control means responsive to image signals representing the image or pattern for causing the liquid crystal display to display a desired image or pattern.

* * * * *